(12) United States Patent
Kappler et al.

(10) Patent No.: US 8,422,627 B2
(45) Date of Patent: *Apr. 16, 2013

(54) METHOD FOR DETECTING X-RAY RADIATION AND X-RAY SYSTEM

(75) Inventors: Steffen Kappler, Effeltrich (DE);
Christian Schröter, Bamberg (DE);
Karl Stierstorfer, Erlangen (DE);
Matthias Strassburg, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 317 days.

This patent is subject to a terminal disclaimer.

(21) Appl. No.: 12/585,579

(22) Filed: Sep. 18, 2009

(65) Prior Publication Data
US 2010/0074397 A1    Mar. 25, 2010

(30) Foreign Application Priority Data
Sep. 22, 2008    (DE) .......................... 10 2008 048 306

(51) Int. Cl.
*A61B 6/03*    (2006.01)
(52) U.S. Cl.
USPC ................................ 378/19; 378/5; 378/98.8
(58) Field of Classification Search ................ 378/5, 19, 378/98.9
See application file for complete search history.

(56) References Cited

U.S. PATENT DOCUMENTS

| 4,812,656 A | 3/1989 | Yamakawa et al. |
| 5,367,168 A | 11/1994 | Berthold et al. |
| 7,332,724 B2 * | 2/2008 | Hefetz et al. ...................... 378/5 |
| 7,345,285 B2 | 3/2008 | Montemont |
| 2006/0269040 A1 * | 11/2006 | Mertelmeier ................... 378/37 |
| 2007/0076842 A1 | 4/2007 | Yanfeng |
| 2010/0086100 A1 * | 4/2010 | Steadman et al. .............. 378/19 |

FOREIGN PATENT DOCUMENTS

| DE | 3710745 C2 | 10/1991 |
| DE | 4223773 A1 | 1/1994 |
| DE | 19721323 A1 | 11/1998 |

OTHER PUBLICATIONS

Dr.rer.nat. Hans Ulrich Schmidt, "Meßelektronik in der Kernphysik", Fraunhofer-Institut für Naturwissenschaftlich-Technische Trendanalysen, Euskirchen, B.G. Teubner Stuttgart 1986, pp. 171-174; Book.

* cited by examiner

*Primary Examiner* — Glen Kao
(74) *Attorney, Agent, or Firm* — Harness, Dickey & Pierce, P.L.C.

(57) ABSTRACT

A method is disclosed for detecting X-ray radiation from an X-ray emitter. In at least one embodiment of the method, an electric pulse with a pulse amplitude characteristic of the energy of a quantum is generated when a quantum of the X-ray radiation impinges on a sensor, wherein a number of threshold energies are predetermined. When the pulse amplitude corresponding to the respective energy is exceeded, a signal is emitted each time the pulse amplitude corresponding to a respective threshold energy is exceeded. At least one embodiment of the method permits reliable and high-quality imaging, even in image regions with high X-ray quanta rates. To this end, at least one of the threshold energies is predetermined such that it is higher than the maximum energy of the X-ray spectrum emitted by the X-ray emitter.

13 Claims, 2 Drawing Sheets

METHOD FOR DETECTING X-RAY RADIATION AND X-RAY SYSTEM

PRIORITY STATEMENT

The present application hereby claims priority under 35 U.S.C. §119 on German patent application number DE 10 2008 048 306.0 filed Sep. 22, 2008, the entire contents of which are hereby incorporated herein by reference.

FIELD

At least one embodiment of the invention generally relates to a method for detecting X-ray radiation from an X-ray emitter. For example, at least one embodiment relates to such a method in which an electric pulse with a pulse amplitude characteristic of the energy of a quantum is generated when a quantum of the X-ray radiation impinges on a sensor, wherein a number of threshold energies are predetermined and when the pulse amplitude corresponding to the respective energy is exceeded, a signal is emitted in each case. It also generally relates to an X-ray system suitable for carrying out the method.

BACKGROUND

X-ray systems are generally used to irradiate a body with X-ray radiation by using an X-ray emitter and to display the penetration through the body by using, for example, a fluorescent screen or an image amplifier. The images are either visualized on suitable film material or phosphorous plates; or by using electronic sensors such as CCDs.

X-ray emitters generally contain an X-ray tube. In its simplest form, the latter includes a cathode and an anode which sit in a vacuum within a sealed glass- or metal body. The cathode emits electrons which are accelerated by high voltage toward the anode and penetrate the anode material. In the process, they are decelerated and mainly generate characteristic X-ray radiation and X-ray bremsstrahlung.

Characteristic X-ray radiation is generated by the energetic electrons accelerated in the X-ray tube knocking out electrons from the innermost shells of the atoms of the anode material in the anode. Electrons from higher energy levels or free electrons "jump" into these gaps which are created. The energy liberated in this process is emitted in the form of discrete energy quanta which are typical for the material.

By contrast, X-ray bremsstrahlung is generated by the deceleration of the electrons when passing through the metal of the anode since every accelerated electric charge generates electromagnetic radiation. The wavelength of the radiation depends on the value of the acceleration such that a higher acceleration voltage or anode voltage generates more X-ray radiation with more energetic quanta. Accordingly, the maximum energy of the bremsstrahlung spectrum is the energy at which the entire kinetic energy of the electron is transferred to a single quantum. This limiting energy only depends on the anode voltage and is independent of the anode material.

In the case of medical X-ray examinations, different radiation energies are required for different regions of the body in order to penetrate through tissues of different densities, such as fatty tissue or bone. As explained above, the voltage supplied to the X-ray tube is decisive in this case. Depending on the desired information to be supplied by the image, the tube voltage is selected between, for example, 38 kV and 120 kV. In the case of low energies, a lot of radiation is absorbed by the tissue; this makes very fine differences in the tissue visible on the X-ray film. By contrast, high-energy radiation penetrates through tissue and materials much more easily and contrast differences are strongly watered down.

In the case of a conventional X-ray method, the object to be imaged is irradiated by an X-ray source and imaged on X-ray film. A projection of the volume on a plane is generated. In this projection, information relating to the third dimension of the irradiated body is lost to a great extent. The reason for this is that retrospectively it is no longer possible to distinguish between attenuation, visible in the X-ray image, being caused by a more dense material or by a larger slice thickness.

This problem is solved by computed tomography (CT), in which many X-ray images of the object are generated from the most diverse directions, and volume information is subsequently reconstructed from these many images. In general, these 3D reconstructions are composed of individual slices which run across the object. This affords the possibility of determining a density for each volume element of the object.

Since computed tomography requires a multiplicity of X-ray images to be recorded within a very short timeframe, CT detectors are required which can directly supply the X-ray image to a data processing unit in digital form. For this purpose, electronic detectors are usually used, e.g. solid-state detectors. In order to spatially resolve the X-ray image, these detectors usually comprise individual X-ray sensors which are arranged like pixels.

The individual sensors of the detector can have very different designs but generally operate on the basis of the inner photoelectric effect. Here, an electric pulse is generated when an X-ray quanta impinges on the sensor, with the pulse amplitude being characteristic of the energy of the quantum. The pixel-like arrangement of the sensors thus in principle affords the possibility of resolving, spatially and energetically, every single incident X-ray quantum.

In order to count the incident X-ray quanta in the connected data processing device, the pulses of the sensors can be counted by a trigger circuit. Here, an energy threshold is prescribed and a count signal is emitted when the pulse amplitude of the sensor corresponding to this energy is exceeded (single pulse triggering). For conventional imaging, this threshold is selected such that it for example is in the range from 15 keV to 35 keV. In the case of dual-energy imaging, provision is made for a further threshold, e.g. in the range from 50 keV to 80 keV.

Due to the high rates of X-ray quanta impinging on the detector occurring in computed tomography, the in principle appealing concept of a detector counting individual quanta constitutes a problem which is difficult to solve. One of the critical points is the finite pulse duration which in typical sensors (e.g. CdTe or CdZnTe) is e.g. approximately 10 ns (full width at half maximum). In conjunction with a required electronic pulse formation this results in effective pulses of the order of e.g. approximately 30 ns which should be registered individually.

In the case of temporally equidistant incident pulses, this alone would limit the maximum measurable rate to approximately 33 MHz per pixel, which in the case of realistic pixel sizes with an edge length of e.g. approximately 200 μm corresponds to a maximum X-ray quanta flux of approximately 825 MHz/mm$^2$. However, since the temporal arrival of the pulses is in fact subject to Poisson statistics, the probability of pulses at least partly overlapping with one or more further pulses is already 26% in the case of (on average) 33 million quanta per pixel and second. In the case of maximal fluxes occurring in computed tomography these days, which are approximately 2 GHz/mm$^2$, this probability actually increases to over 60%. This implies that, despite using e.g. shape filters in the beam path, detector channels which have no or little attenuation, e.g. at the edge of the objects to be examined, are no longer able to resolve individual pulses since the pulses of the incident quanta superpose, possibly even superpose a number of times.

In the case of such a multiple superposition, the pulse amplitude no longer sinks below the level of the predetermined threshold energies of the triggers after every pulse. These then trigger fewer and fewer signals and therefore the signal rate can no longer be unambiguously assigned to the actual quanta flux; this is referred to as the onset of paralysis. In the case of even higher quanta fluxes, it is more and more seldom for the pulse amplitude to drop below the level of the predetermined threshold energies of the triggers since the pulse amplitude is continuously increased by superposing pulses. The trigger then no longer triggers a signal; the signal rate tends to zero. In regions of relatively strong superposition, i.e. at the edge of the observed objects or in the air, for example, this can result in data having to be discarded.

SUMMARY

At least one embodiment of the invention specifies a method for measuring X-ray radiation and an X-ray system which also permits reliable and high-quality imaging, even in image regions with high X-ray quanta rates.

With respect to the method, according to at least one embodiment of the invention, at least one of the threshold energies is higher than the maximum energy of the X-ray spectrum emitted by the X-ray emitter.

At least one embodiment of the invention is based on the consideration that particularly reliable and high-quality imaging would also be possible in image regions with high X-ray quanta rates if a reliable count of pulses could be guaranteed, even if a number of pulses are superposed. Here, the recognition that the pulse amplitudes add up when pulses superpose can be used consistently. At most double the value of the single pulse amplitude can be achieved in the case of a double superposition. So as to be able to measure such a correspondingly higher pulse amplitude, an additional, higher threshold energy for a trigger should therefore be predetermined. So that this trigger signal provided for double superpositions really only detects superposed pulses, the threshold energy should be predetermined such that it is higher than the maximum energy of the X-ray spectrum emitted by the X-ray emitter. This is because such an energy cannot be attained by an individual X-ray quantum and the triggering at the higher threshold energy in this case only detects at least doubly superposed pulses. By predetermining additional, even higher threshold energies, multiply-superposed pulses can be counted accordingly.

In an advantageous refinement of at least one embodiment of the method, a signal is emitted if the respectively predetermined threshold energy is not undershot within a predetermined period of time. This means that a measurement of multiply-superposed pulses is not only detected by the addition of pulse amplitudes, but also by the increased duration of the electric pulse. This is because even if the pulse duration of the measured pulse is longer than the usual duration of an individual pulse, this is an indication for the superposition of a number of individual pulses. By combining this duration measurement with the pulse amplitude measurement, a more precise and reliable measurement of superposed pulses can be afforded. If only one additional threshold energy is specified above, for example, twice the typical energy of an X-ray quantum, it is already possible to count three-fold superposed pulses, specifically by using the trigger of the first threshold energy, the trigger of the second threshold energy and by using the duration trigger.

The output signal is advantageously a count signal. Combined with the higher threshold energies for the signal triggering triggers, this permits direct counting of the quanta impinging on the X-ray detector in contrast to the previously usual energy measurement of the X-ray flux. This also affords the possibility of an arbitrary weighting of the measured quantum flux with a different function than energy in order to improve the image contrast. This makes simpler and more reliable imaging possible.

With respect to the X-ray system, at least one embodiment of the X-ray system comprises an X-ray emitter, a detector with a plurality of sensors, with each sensor being designed such that it generates an electric pulse with a pulse amplitude characteristic of the energy of a quantum when said sensor is impinged by a quantum of the X-ray radiation, and a data processing unit connected to the respective sensor, which data processing unit evaluates the pulses from the respective sensor or from a number of sensors by means of a trigger circuit with a number of predetermined threshold energies, which in each case emits a signal when the pulse amplitude corresponding to the respective energy is exceeded, wherein at least one of the predetermined threshold energies is higher than the maximum energy of the X-ray spectrum emitted by the X-ray emitter.

Such an X-ray system is advantageously used in a computed tomography system, or in any other equipment which operates using very high X-ray beam fluxes.

Advantages connected to at least one embodiment of the invention in particular include the facts that predetermining the threshold energies which are higher than the maximum energy of the X-ray spectrum emitted by the X-ray emitter affords the possibility of detecting multiply-superposed electric pulses of the X-ray detectors sensors and that these can still be used for imaging, particularly in the case of high rates and multiple superposition of pulses. Such a pile up rate measurement of the incident X-ray quanta is quasi-linear with respect to the X-ray energy impinging on the detector, even in this regime with extremely high quanta rates. Although an increase of the statistical error compared to the individual pulse measurement can be expected, and the energy resolution of the individual quanta is also lost, this additional information however constitutes a significant improvement in the case of multiply-superposed X-ray quanta where pure triggering from individual pulses fails.

That is to say, overall, significantly improved image reconstruction is possible in computed tomography, or is even made possible in regimes with high quanta rates, such as on the edge of the examined objects or in the air.

BRIEF DESCRIPTION OF THE DRAWINGS

An example embodiment of the invention will be explained in more detail on the basis of the drawings, in which.

In all figures, identical parts are provided with an identical reference symbol.

DETAILED DESCRIPTION OF THE EXAMPLE EMBODIMENTS

Figure 1:
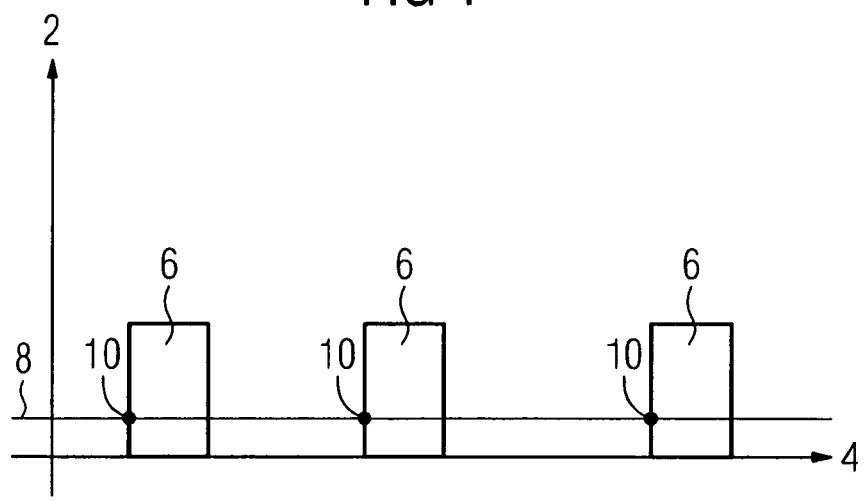
FIG. 1 shows, in an example manner, a schematic diagram of the pulse amplitude plotted over time, in which signals of an X-ray system detector are shown in the region of low quanta rates.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a schematic graph of the output data of an X-ray system detector sensor. Here, the pulse amplitude 2 of the electric pulses which are output by the sensor when an X-ray beam quantum impinges thereon is plotted against time 4. The output data as per FIG. 1 show the situation of the sensor in a region in which the electric pulses 6 do not overlap, but the rate of the incident X-ray quanta on the sensor is so low that the electric pulses 6 are separated in time from one another. That is to say there is no superposition of electric pulses 6.

A trigger is provided to count the electric pulses 6 and it generates a signal 10 if the pulse amplitude 2 exceeds a predetermined threshold energy 8. This signal 10 serves as a count signal for a data processing unit associated with the X-ray system, as a result of which the quanta impinging on the detector or the individual sensors thereof are counted and hence imaging is made possible. Here, imaging by counting individual quanta already offers a significantly higher quality than by only taking account of the energy incident on a sensor.

Figure 2:
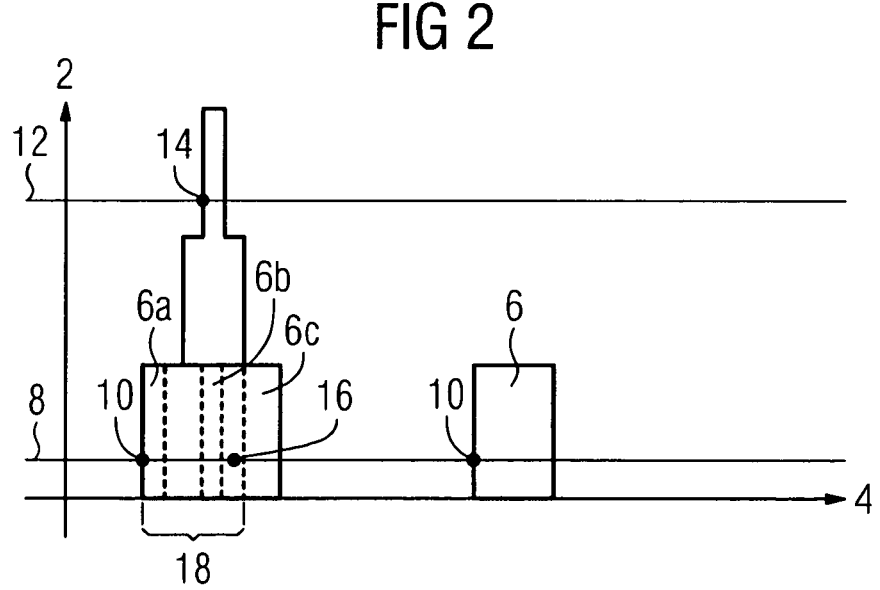
FIG. 2 shows a diagram as per FIG. 1 with a number of superposing pulses.

Counting individual quanta becomes problematic if a number of electric pulses 6 are superposed by quanta impinging on the detector in quick succession. Here, in the left region, FIG. 2 shows a first electric pulse 6a, a second electric pulse 6b and a third electric pulse 6c (illustrated with dashed lines), which occur in quick succession and are superposed on one another. Here, the pulse amplitudes 2 of the three electric pulses 6a, 6b, 6c increase cumulatively, and this results in a pulse with three times the amplitude.

Despite the superposition, the threshold energy 8 is only exceeded once and therefore only a single signal 10 is triggered. Hence, there is only one signal 10 despite three incident light quanta and three electric pulses 6a, 6b, 6c. This results in a nonlinear behavior between signal rate and actual quantum rate and as a result the count result is falsified compared to the actually irradiated amount of quanta. In the case of an additional, multiple superposition of pulses, this can lead to the detected data no longer being suitable for imaging.

In order to nevertheless be able to count the three successive electric pulses 6a, 6b, 6c, an additional threshold energy 12 is predetermined in addition to the threshold energy 8 and the former is higher than the maximum energy emitted by the X-ray tube of the X-ray emitter and hence it is higher than the maximum amplitude of an individual electric pulse 6. As a result, the trigger for this threshold energy 12 only triggers a signal 14 if a number of electric pulses 6a, 6b, 6c are superposed. This ensures reliable counting of even a number of superposed electric pulses 6a, 6b, 6c and hence this data can also be used for imaging. Overall, as a result of this, better and higher quality imaging is possible.

Furthermore, an additional trigger can be used which triggers a signal 16 as soon as the duration of the electric pulse 6a, 6b, 6c is greater than a predetermined interval 18. This is because a number of superposed pulses 6a, 6b, 6c are also characterized by an increased pulse duration. By additionally using such a time signal, a further improved count and hence even higher quality imaging can be ensured. By combining the signal 10 of the first threshold energy 8, the signal 14 of the further threshold energy 12 and the signal 16 of the interval 18, it is even possible to count the three electric pulses 6a, 6b, 6c, despite their superposition.

Figure 3:
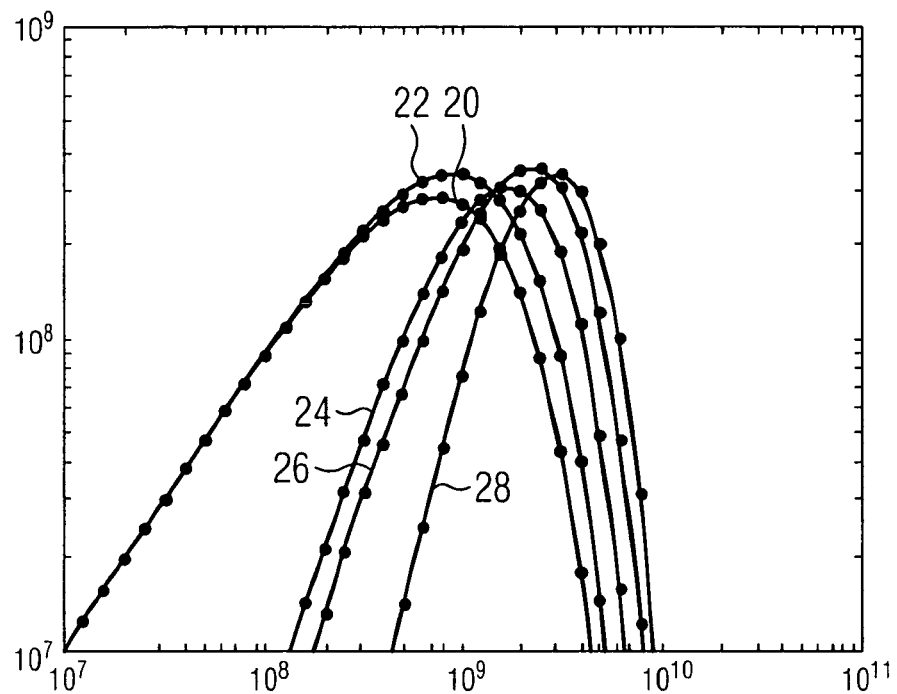
FIG. 3 shows a diagram of the count rate of triggers with different threshold energies plotted against the actual number of quanta using a log-log scale.
Figure 4:
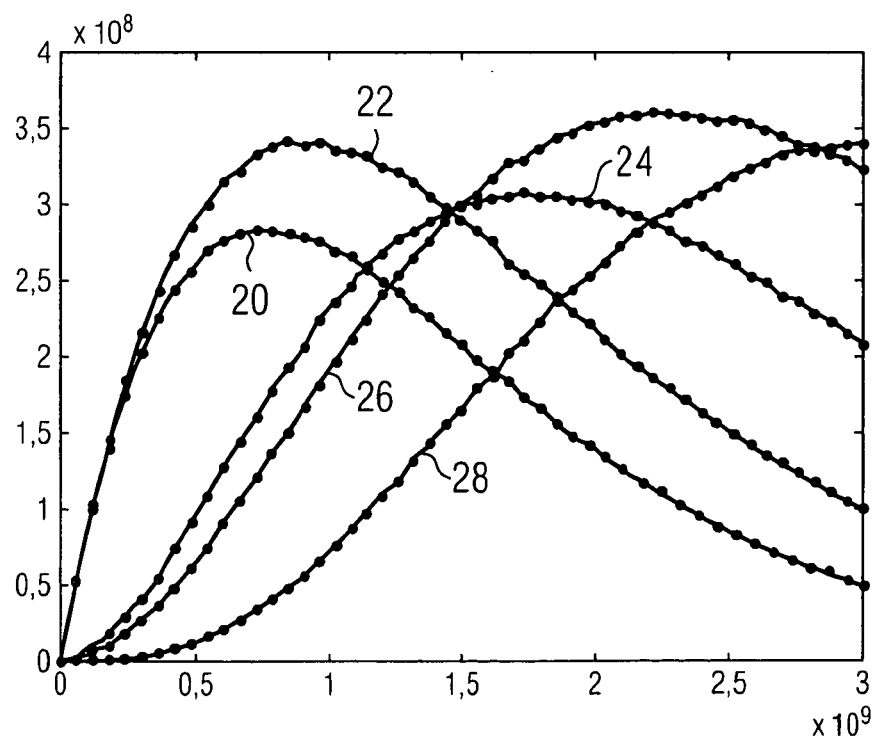
FIG. 4 shows a diagram as per FIG. 3 with a linear scale.

FIGS. 3 and 4 show, in an example fashion, a graph of the measured quanta flux onto approximately 200×200 pmt pixels plotted against the actual flux of mono-energetic, Poisson-distributed quanta with an energy of 120 keV in Hz/mm$^2$.

The data was generated by simulation and respectively shows the signal of a trigger at a threshold energy of 35 keV in curve 20, the signal of a trigger at a threshold energy of 70 keV in curve 22, and, in curves 24, 26 and 28 the respective signals of triggers at threshold energies of respectively 140 keV, 210 keV and 280 keV.

Here, the three last-mentioned threshold energies are above the maximum obtainable energies from the X-ray tube and thus constitute pile-up triggers which only show superpositions of a number of electric pulses.

The profiles of curves 20, 22 in each case firstly show a linear relationship between the measured rate and the actual rate, whereas the profiles of curves 24, 26 and 28 are nonlinear at small rates but quasi-linear at high rates. The signals of these pile-up trigger impulses, the threshold energies of which are above the maximum energy of the X-ray tube, do not detect individual pulses and therefore have absolute measured rates which are below the rates of the two curves 20 and 22.

In the case of rates at which a number of pulses superpose and the pulse amplitudes increase, the threshold energies of the individual triggers are exceeded for ever longer periods of time and the triggers no longer trigger signals. As a result of this, the measured flux reaches a maximum (onset of paralysis) and even falls thereafter because the pulse amplitude is quasi-permanently above the corresponding threshold energy of the trigger and almost no signals are triggered anymore (complete paralysis).

Now, both FIG. 3 and FIG. 4 show that the additional introduction of a higher threshold energy results in the triggers corresponding to these threshold energies only becoming paralyzed and no longer generating signals at higher fluxes, i.e. further to the right in the diagrams of FIGS. 3 and 4. Skilled combination of these signals with the signals of the individual pulse triggers of curves 20 and 22 can thus generate a measured flux which is linear with respect to the actual incident flux, in particular in regions above the maximum of curves 20 and 22 as well, that is to say in regions where the triggers with threshold energies below the maximum energy of the X-ray tube no longer supply useful data. This can ensure significantly improved imaging by the X-ray system.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for detecting X-ray radiation from an X-ray emitter, the method comprising:
   generating an electric pulse with a pulse amplitude characteristic of energy of a quantum when a quantum of the X-ray radiation impinges on a sensor, wherein a number of threshold energies are determined before the electric pulse is generated; and
   emitting a signal, each time the pulse amplitude corresponding to a respective threshold energy is exceeded, at least one of the determined threshold energies being relatively higher than a cumulative maximum energy of an entire X-ray spectrum emitted by the X-ray emitter.

2. The method as claimed in claim 1, wherein the signal is emitted when the respectively determined threshold energy is not undershot within a period of time.

3. The method as claimed in claim 2, wherein the signal is a count signal.

4. The method as claimed in claim 1, wherein the signal is a count signal.

5. A non-transitory computer readable medium including program segments for, when executed on a computer device, causing the computer device to implement the method of claim 1.

6. An X-ray system, comprising:
   an X-ray emitter;
   a detector with a plurality of sensors, each of the plurality of sensors being designed to generate an electric pulse with a pulse amplitude characteristic of energy of a quantum when the sensor is impinged by a quantum of X-ray radiation; and
   a data processing unit connected to the plurality of sensors, the data processing unit being configured to evaluate the electric pulses from at least one respective sensor via a trigger circuit with a number of threshold energies, the trigger circuit emitting a signal each time the pulse amplitude corresponding to a respective threshold energy is exceeded, wherein at least one of the threshold energies is relatively higher than a cumulative maximum energy of an entire X-ray spectrum emitted by the X-ray emitter.

7. The X-ray system as claimed in claim 6, wherein the trigger circuit emits the signal when the respective threshold energy is not undershot within a period of time.

8. The X-ray system as claimed in claim 7, wherein the signal is a count signal.

9. A computed tomography system comprising an X-ray system as claimed in claim 8.

10. A computed tomography system comprising an X-ray system as claimed in claim 7.

11. The X-ray system as claimed in claim 6, wherein the signal is a count signal.

12. A computed tomography system comprising an X-ray system as claimed in claim 11.

13. A computed tomography system comprising an X-ray system as claimed in claim 6.

* * * * *